United States Patent
Salamon et al.

(10) Patent No.: US 12,405,734 B2
(45) Date of Patent: Sep. 2, 2025

(54) ADAPTIVELY SELECTING COMPRESSION PROCESS BASED ON END-TO-END PERFORMANCE

(71) Applicant: Dell Products L.P., Round Rock, TX (US)

(72) Inventors: Victor Salamon, Edmonton (CA); Paul N. Berube, Edmonton (CA)

(73) Assignee: Dell Products L.P., Round Rock, TX (US)

( * ) Notice: Subject to any disclaimer, the term of this patent is extended or adjusted under 35 U.S.C. 154(b) by 49 days.

(21) Appl. No.: 18/495,929

(22) Filed: Oct. 27, 2023

(65) Prior Publication Data

US 2025/0138735 A1 May 1, 2025

(51) Int. Cl.
*G06F 3/06* (2006.01)

(52) U.S. Cl.
CPC .......... *G06F 3/0626* (2013.01); *G06F 3/0647* (2013.01); *G06F 3/067* (2013.01)

(58) Field of Classification Search
CPC ....... G06F 3/0626; G06F 3/0647; G06F 3/067
See application file for complete search history.

(56) References Cited

U.S. PATENT DOCUMENTS

| | | | |
|---|---|---|---|
| 6,381,368 B1* | 4/2002 | Kanatsu | G06T 9/00 375/240 |
| 8,924,647 B1 | 12/2014 | Evans | |
| 9,385,749 B1* | 7/2016 | Nam | H03M 7/607 |
| 9,952,771 B1* | 4/2018 | Bigman | G06F 3/0659 |
| 9,985,649 B1 | 5/2018 | Bassov et al. | |
| 10,466,921 B1* | 11/2019 | Martin | G06F 3/064 |
| 10,521,317 B1* | 12/2019 | Ippatapu | H04L 67/1095 |
| 10,585,604 B2 | 3/2020 | Bassov | |
| 10,749,546 B1* | 8/2020 | Sun | H03M 7/6088 |
| 11,500,540 B2 | 11/2022 | Faibish et al. | |
| 2019/0007493 A1* | 1/2019 | Gray | H04L 67/1097 |
| 2020/0142628 A1 | 5/2020 | Armangau et al. | |
| 2021/0036714 A1* | 2/2021 | Martin | G06F 13/1668 |
| 2022/0131556 A1* | 4/2022 | Teixeira De Abreu Pinho | G06F 18/214 |
| 2022/0415343 A1* | 12/2022 | Kondo | G11B 5/00813 |
| 2023/0021513 A1* | 1/2023 | Marrotte | G06F 16/11 |

* cited by examiner

*Primary Examiner* — Ryan Bertram
(74) *Attorney, Agent, or Firm* — BainwoodHuang

(57) ABSTRACT

A technique for transferring data from a host to a data storage system includes monitoring performance metrics indicative of data compression and network transmission from the host to the storage system and dynamically selecting a compression process from among multiple options of compression processes to optimize end-to-end performance based on the monitored indicators.

20 Claims, 3 Drawing Sheets

ADAPTIVELY SELECTING COMPRESSION PROCESS BASED ON END-TO-END PERFORMANCE

BACKGROUND

Data storage systems are arrangements of hardware and software in which storage processors are coupled to arrays of non-volatile storage devices, such as magnetic disk drives, electronic flash drives, and/or optical drives. The storage processors, also referred to herein as "nodes," service storage requests arriving from host machines ("hosts"), which specify blocks, files, and/or other data elements to be written, read, created, deleted, and so forth. Software running on the nodes manages incoming storage requests and performs various data processing tasks to organize and secure the data elements on the non-volatile storage devices.

A common activity of hosts of a data storage system is to transfer data over a network to the storage system, which stores and secures the data that it receives. Some hosts compress their data before sending it over the network to the storage system. For example, a host may select a particular compression algorithm and compress the data using that algorithm. As the compressed data is smaller in size than the uncompressed data from which it is computed, the compressed data can be transferred over the network more quickly than the uncompressed data. The network-transfer time saved by compressing the data may more than compensate for the time spent compressing it.

SUMMARY

Unfortunately, the above-described approach to data compression can be inefficient. For example, the host may select a particular compression algorithm and proceed with that algorithm for all transfers over a long period of time, even as circumstances change. For example, available network bandwidth may increase or decrease, and processors that perform the compression may be under various degrees of load. Also, the compressibility of the data itself may change over time. Video data may be much less compressible than text-based data, for example. The best compression algorithm for one set of circumstances may be different from the best compression algorithm for another set of circumstances. Nevertheless, the prior approach uses the same algorithm regardless of circumstances. What is needed, therefore, is a way of implementing different compression algorithms adaptively as circumstances change.

The above need is addressed at least in part by an improved technique for transferring data from a host to a data storage system. The technique includes monitoring performance metrics indicative of data compression and network transmission from the host to the storage system and dynamically selecting a compression process from among multiple options of compression processes to optimize end-to-end performance based on the monitored metrics.

Advantageously, the improved technique selects a process that performs best overall, accounting for both computing and network resources and dynamically adjusting its selection of process as circumstances change. The improved technique thus benefits from more optimal selections of processes more of the time, promoting the best possible performance.

Certain embodiments are directed to a method of transferring data from a host to a data storage system. The method includes applying a plurality of compression processes in compressing respective elements of host data, and monitoring, for each of the plurality of compression processes, a respective set of performance metrics, each set of performance metrics being indicative of (i) computing performance that results from compressing elements of host data using the respective compression process and (ii) network performance that results from sending compressed elements of host data that are compressed using the respective compression process to the data storage system, each set of performance metrics indicating a respective score. The method further includes selecting, based on the monitoring, one of the plurality of compression processes at a time for primary use in compressing elements of host data, each selected process associated with a best score at the respective time.

Other embodiments are directed to a computerized apparatus constructed and arranged to perform a method of transferring data, such as the method described above. Still other embodiments are directed to a computer program product. The computer program product stores instructions which, when executed on control circuitry of a computerized apparatus, cause the computerized apparatus to perform a method of transferring data, such as the method described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views.

DETAILED DESCRIPTION

Embodiments of the improved technique will now be described. One should appreciate that such embodiments are provided by way of example to illustrate certain features and principles but are not intended to be limiting.

An improved technique for transferring data from a host to a data storage system includes monitoring performance metrics indicative of data compression and network transmission from the host to the storage system and dynamically selecting a compression process from among multiple options of compression processes to optimize end-to-end performance based on the monitored metrics.

Embodiments of the improved technique recognize that the best end-to-end performance when transmitting data from a host to a storage system depends on circumstances, such as how long it takes the host to perform compression under its current load conditions and how long it takes the network to transfer compressed data given its currently available bandwidth. For example, longer compute times that are needed to achieve higher compression ratios may be justified when available network bandwidth is low, as the time saved by transmitting smaller elements of compressed data more than offsets the extra time spent compressing the data. But longer compute times needed to achieve greater compression may not be justified when available network bandwidth is high, as large compressed data elements can be transmitted quickly. Thus, the best choice of compression depends on circumstances and typically changes as circumstances change. The best choice at 2 pm, when network traffic is high, may not be the best choice at 2 am, when network traffic is low. Also, greater compression may be less costly when computers are otherwise idle, but may be extremely costly when computers are busy, particularly if they are busy with time-critical data-storage operations. As described below, the improved technique dynamically adjusts to changing circumstances based on real-time data indicative of end-to-end performance, taking into account both computing performance and network performance, and selecting an optimal compression process for the current situation.

Figure 1:
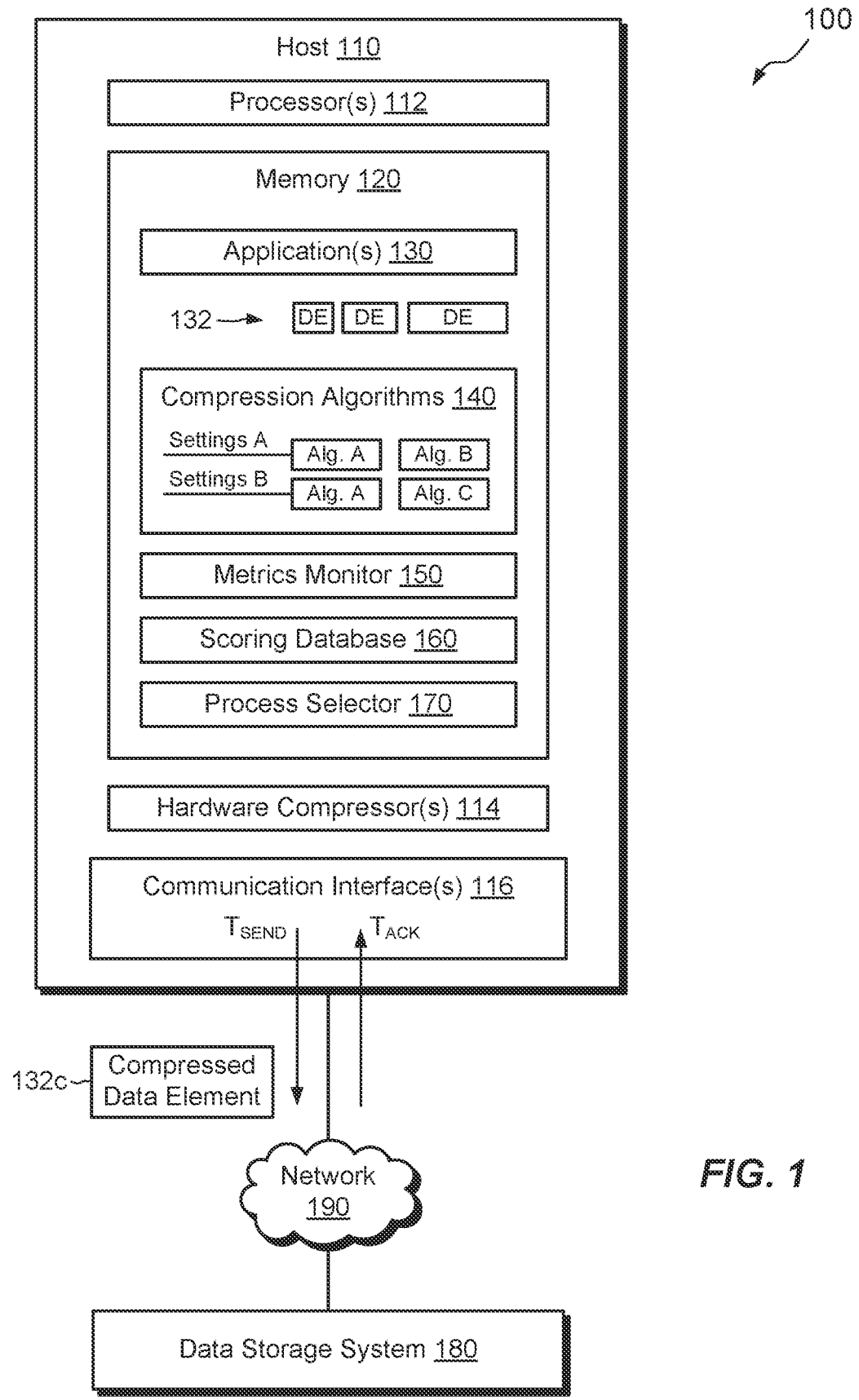
FIG. 1 is a block diagram of an example environment in which embodiments of the improved technique can be practiced.

FIG. 1 shows an example environment 100 in which embodiments of the improved technique can be practiced. As shown, a host 110 is configured to access a data storage system 180 over a network 190. The data storage system 180 typically includes one or more storage processors and persistent backend storage, such as multiple solid state drives, magnetic disk drives, or the like. The network 190 may be any type of network or combination of networks, such as a storage area network (SAN), a local area network (LAN), a wide area network (WAN), the Internet, and/or some other type of network or combination of networks, for example. The host 110 may connect to the data storage system 180 using various technologies, such as Fibre Channel, iSCSI (Internet small computer system interface), NVMeOF (Non-volatile Memory Express (NVMe) over Fabrics), NFS (network file system), and CIFS (common Internet file system), for example. As is known, Fibre Channel, iSCSI, and NVMeOF are block-based protocols, whereas NFS and CIFS are file-based protocols. The data storage system 180 is configured to receive I/O requests from the host 110 according to block-based and/or file-based protocols and to respond to such I/O requests by reading or writing backend storage.

As further shown in the example of FIG. 1, the host 110 includes a set of processors 112, one or more hardware compressors 114, one or more communication interfaces 116, and memory 120. The set of processors 112 includes one or more processing chips and/or assemblies, such as multiple multi-core CPUs (central processing units). The hardware compressors 114 include one or more hardware chips or assemblies dedicated to data compression and decompression. The communication interfaces 116 include, for example, SCSI initiator adapters and/or network interface adapters. The memory 120 includes both volatile memory, e.g., RAM (Random Access Memory), and non-volatile memory, such as one or more ROMs (Read-Only Memories), disk drives, solid state drives, and the like. The set of processors 112 and the memory 120 together form control circuitry, which is constructed and arranged to carry out various methods and functions as described herein. Also, the memory 120 includes a variety of software constructs realized in the form of executable instructions. When the executable instructions are run by the set of processors 112, the set of processors 112 carry out the operations of the software constructs. Although certain software constructs are specifically shown and described, it is understood that the memory 120 typically includes many other software components, which are not shown, such as an operating system, various applications, processes, and daemons.

As further shown in FIG. 1, the memory 120 "includes," i.e., realizes by execution of software instructions with associated data, one or more software applications 130, multiple compression algorithms 140, a metrics monitor 150, a scoring database 160, and a process selector 170. The software applications 130 may be diverse in nature and may include, for example, email applications, virtual machine applications, user programs, and the like. In an example, the applications 130 are configured to work with data elements (DE) 132, such as files, directories, data blocks, volumes, objects, or the like, which may be persistently stored in the data storage system 180.

The compression algorithms 140 include multiple options for data compression, such as Algorithm A, Algorithm B, and Algorithm C. One of the depicted algorithms can be configured with different settings, such as Algorithm A with Settings A and Algorithm A with Settings B. Any number of the algorithms may be configurable with multiple settings, however. Non-limiting examples of the algorithms include Bzip, Gzip, LZ77, and the like. Non-limiting examples of settings include buffer size (used to analyze and compress data), length of the longest match found in the buffer, and distance to the longest match found in the buffer. Although not shown, the hardware compressor(s) 114 may also be configurable with different settings. As used herein, the term "compression process" refers to any combination of compression algorithm (or hardware method) and its associated settings. For example, Algorithm A with Settings A is considered herein to be one compression process and Algorithm A with Settings B is considered to be another. Algorithms B and C are also respective compression processes, as is each hardware compressor 114 with its associated settings. In some examples, no compression is also one of the available compression processes. For example, no compression may be the best choice if the data elements 132 are already in compressed form, such as may be the case for video data or audio data. Although both hardware and software compression processes have been described, embodiments of the disclosure do not require both kinds of compression processes, only multiple choices of compression processes. Thus, for example, some embodiments may contain only software compression processes while others may include only hardware compression processes.

The metrics monitor 150 is configured to monitor aspects of compression performance when compressing data elements 132 and aspects of network performance when transmitting compressed data elements 132c to the data storage system 180 over the network 190. For example, the metrics monitor 150 is configured to track a start time $T_{START}$ when a compression job is submitted to any of the compression processes and a stop time $T_{STOP}$ when the compression job is completed. From the start and stop times, the metrics monitor 150 calculates a time difference ($T_{STOP}-T_{START}$) to arrive at the total compute time for completing the compression job. Time may be measured using a system clock of the host 110, for example. The metrics monitor 150 may also monitor network transmission time for sending each compressed data element 132 over the network 190. For example, the metrics monitor 150 may obtain, from a communication interface 116, a time $T_{SEND}$ when a compressed data element 132 is sent over the network 190 to the data storage system 180, as well as a time $T_{ACK}$ when the communication interface 116 receives an acknowledgement back from the data storage system 190 that the compressed data element 132 was received. The metrics monitor 150 may then calculate the network time needed to complete the transfer as the difference $T_{ACK}-T_{SEND}$. The network transmission time thus represents a round-trip time to the data storage system and back. Given that acknowledgements are very small, however, the vast majority of the calculated time is the time for sending the data and only a small portion is the time for sending back the acknowledgement. It is noted that the time measurement is handled based entirely on measurements made by the host 110 and does not require any synchronization between the host 110 and the data storage system 180.

The scoring database 160 is configured to associate compression processes with associated scores computed from metrics gathered by the metrics monitor 150. The scoring database 160 will be described in greater detail in connection with FIG. 2.

The process selector 170 is configured to select a current compression process from among the compression algorithms 140 and the hardware compression options 114. For example, the process selector 150 is configured to select one compression process for primary use in compressing data to be sent to the data storage system 180.

In example operation, the host 110 runs applications 130, which access or form data elements 132. The host 110 compresses and transmits the data elements 132 to the data storage system 180. In accordance with improvements hereof, the host 110 selects an optimal compression process for compressing data elements 132 based on actual end-to-end performance.

For example, the host 110 initially engages in an exploration phase, in which the host 110 selects each of the available compression processes in turn (e.g., randomly, round-robin, etc.), monitors the performance of each compression process, computes a score for each process, and stores the resulting scores in the scoring database 160. The host 110 repeats the selecting, monitoring, scoring, and storing until it has enough samples of each compression process to obtain a representative average score for each compression process. The host 110 then selects the best-scoring compression process.

The host 110 may then engage in an exploitation phase, in which the host 110 primarily uses the selected compression process for compressing data elements 132 to be sent to the data storage system 180. During this phase, the host 110 may continue to sparsely monitor performance of the selected compression process. For example, the host 110 may disable the metrics monitor 150 for the compression and transmission of most data elements 132, but may occasionally enable monitoring to account for changing circumstances. In an example, the rate at which the metrics monitor 150 is enabled to monitor the selected compression process is a tunable setting, which may be adjusted, for example, by administrators or users. Typical values of this setting may be between 0.5% and 5% of data elements 132 being compressed and stored, for example.

During the subsequent exploitation phase, the host 110 may also sparsely apply and monitor performance of at least some of the currently non-selected compression processes. This behavior enables some degree of continued exploration, such that the host 110 is able to adjust to changing circumstances. Also, limiting the degree of continued exploration avoids substantial negative impacts on I/O performance, which might otherwise result if poorly performing compression processes were applied too often. In an example, the rate at which non-selected compression processes are selected and monitored is also a tunable setting, which may be adjusted by administrators or users, for example. Typical values of this setting may be between 0.5% and 5% of data elements 132. In some examples, the compression processes applied during the exploitation phase may be limited only to the processes that scored well during the exploration phase.

The above-described arrangement enables the host 110 initially to select a compression process that performs best overall, and then to exploit that selection going forward. However, the described arrangement also adapts to changing circumstances through sparse monitoring of the selected process and the sparse application and monitoring of currently non-selected processes. For example, if a currently non-selected compression process begins to show better end-to-end performance than the currently selected process, the score of the currently non-selected process will eventually cross the score of the current selected process, and the process selector 170 will promote the currently non-selected process to be the currently selected process. The host 110 will then primarily use the newly selected process for a time, sparsely sampling the newly selected process and the then-non-selected processes, eventually replacing the newly selected process with another process that scores better. The described arrangement thus provides a balance between exploitation and continued exploration, and that balance can be adjusted via the tunable settings.

Readers may recognize the general form of the challenge presented herein as being similar to that posed by the multi-armed bandit problem, i.e., how to choose between multiple options when each option has an unknown payout. The challenge presented in the instant application goes further, however, in that the payout of each option (compression process) is not only unknown but also variable over time.

Although the embodiment shown in FIG. 1 assumes only a host 110, a data storage system 180, and a network 190, embodiments may include other computing machines, as well. For example, one or more other computers may be provided for handling compression on behalf of the host 110, so that the host is free to run its applications 140 without being burdened with the additional compression workload. In such examples, the depicted hardware compressor(s) 114, compression algorithms 140, metrics monitor 150, scoring database 160, and process selector 170 may be located on the other computer(s).

Although certain metrics have been described (compression time and network time), these are merely examples. Other metrics may be used additionally or alternatively. For instance, some examples may account for data decompression, which may be performed by the data storage system 180 or by the host 110 upon retrieving compressed user data 132*c* from the data storage system 180. We have observed, however, that decompression time is typically much smaller than compression time and can be safely ignored for many purposes.

In some examples, compressed data elements 132*c* sent to the data storage system 180 may be accompanied by instructions to decompress the data elements 132*c* upon receipt. Data storage systems are typically capable of fast decompression, such that the time required for decompression is expected to be negligible. Also, storage systems typically apply their own data reduction facilities, such as compression and/or deduplication. It may thus be more efficient for a storage system to decompress data from the host 110 upon receipt, such that the storage system can perform its own data reduction more efficiently.

Figures 2, 3:
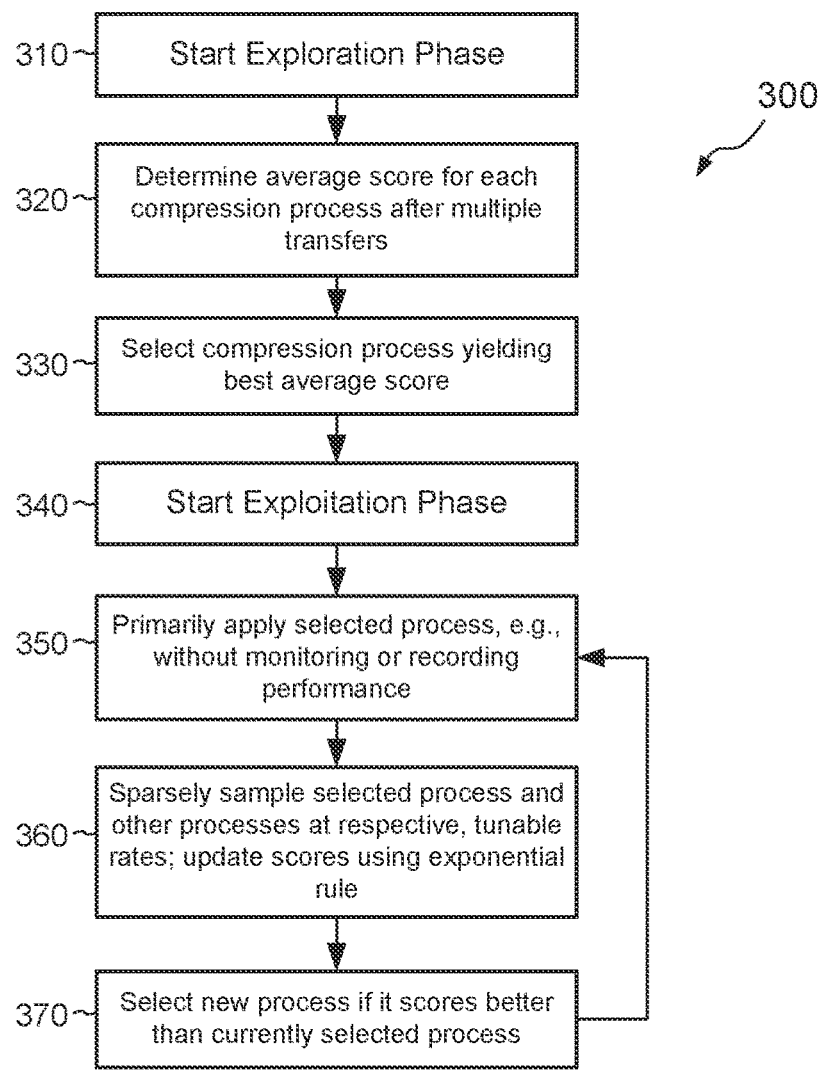
FIG. 2 is a diagram of an example scoring database of FIG. 1.
FIG. 3 is a flowchart showing an example method of selecting compression processes in the environment of FIG. 1.

FIG. 2 shows an example scoring database 160 in additional detail. The scoring database 160 may be represented as a table (as shown), as multiple tables, or as any other suitable data structures. Preferably, the scoring database 160 is persisted, such that its contents are maintained upon reboots or in the case of system errors.

As shown, the scoring database 160 includes a list of all available compression processes 210, which in this example include software compression algorithms, hardware compression methods, and no compression. The compression processes 210 are associated with respective scores 250, which may be computed based on respective compute times 220 ($T_{STOP}-T_{START}$), respective network times 230 ($T_{ACK}-T_{SEND}$), and respective uncompressed sizes 240 of data elements 132 that were transmitted. One should appreciate that compute times 220, network times 230, and sizes 240 may be excluded from the scoring database in some examples, as only the scores 250 may be needed in certain implementations.

The treatment of scores 250 may depend upon phase. During the exploration phase, for example, scores may simply be averaged together. For example, a score 250 may be computed for each data element 132 that is compressed and stored, and multiple scores computed for each compression process 210 may be averaged. During the exploitation phase, when monitoring is sparse, scores may be exponentially weighted, such that newer scores eventually predominate over older scores.

In general, the score 250 for any given data element 132 may be calculated as follows:

$$\text{Score} = \frac{\text{Time}_{Compute} + \text{Time}_{Network}}{\text{Size}}, \quad \text{(EQ. 1)}$$

where $\text{Time}_{Compute}$ is the compute time 220 for compressing the data element 132 and $\text{Time}_{Network}$ is the network time 230 that it took to transmit the data element over the network 190 to the data storage system 180.

Given EQ. 1, it is evident that lower scores are associated with shorter compute and network times and that higher scores are associated with longer compute and network times. Thus, lower scores in this arrangement correspond to better performance and higher scores correspond to worse performance. A best score 260 has a value of 800, which is the best score because it is the smallest. One should appreciate, however, that scores 250 could be defined differently, such that better scores would be higher, e.g., by taking the reciprocal of the EQ. 1 above. The best score 260 identifies a best performing compression process 270.

During the exploration phase, the average score for each compression process 210 may be calculated as $$\text{Score}_{Avg} = \frac{1}{N} * \sum_{i=1}^{N} \text{Score}_i, \quad \text{(EQ. 2)}$$

where N is the number of scores that are used in calculating the average. A separate average score may be calculated for each compression process 210.

During the exploitation phase, exponential weighting may be applied when updating scores for both the selected process and the currently unselected processes, such that each new score is computed from a respective old score as follows:

$$\text{Score}_{New} = a * \frac{\text{Time}_{Compute} + \text{Time}_{Network}}{\text{Size}} + (1-a) * \text{Score}_{Old}. \quad \text{(EQ. 3)}$$

Here, $\text{Time}_{Compute}$, $\text{Time}_{Network}$, and Size are provided for the current data element 132, i.e., the one for which the new score is being computed. Also, a represents the contribution of the current data element to the new score and (1−a) represents the contributions of the previous data elements to the new score. The value of a thus specifies how quickly the scores respond to recent changes. A value of 0.1 for a means that a current data element contributes 10% to the new score and the previous data elements together contribute 90%. After several updates, the new scores predominate over the older scores. In some examples, the value of a is a tunable setting.

In some examples, the value of a may include a component that weights larger transfers more heavily than smaller ones. In this simple example, we assume that all transfers are the same size (1 MB). This is not required, however, as different transfers may involve data elements 132 of different sizes. In such cases, it may be appropriate to weight larger transfers more heavily than smaller ones, with the rationale being that one large transfer may be equivalent to multiple smaller ones.

Figure 4:
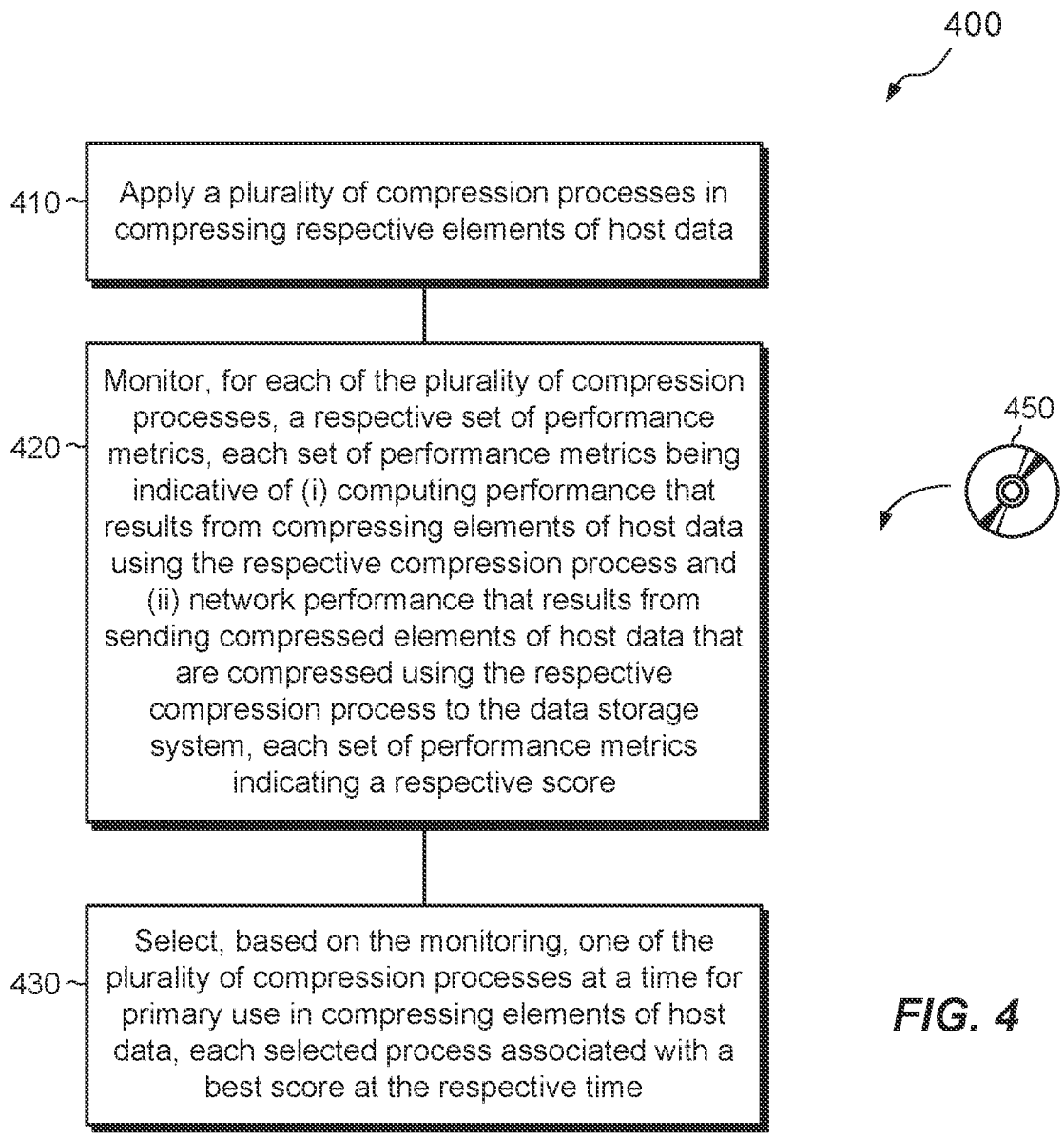
FIG. 4 is a flowchart showing an example method of transferring data from a host to a data storage system.

FIGS. 3 and 4 show example methods 300 and 400 that may be carried out in connection with the environment 100. The methods 300 and 400 are typically performed, for example, by the software constructs described in connection with FIG. 1, which reside in the memory 120 of the host 110 and are run by the set of processors 112. The various acts of methods 300 and 400 may be ordered in any suitable way. Accordingly, embodiments may be constructed in which acts are performed in orders different from those illustrated, which may include performing some acts simultaneously.

FIG. 3 shows example method 300 of selecting compression processes. The method 300 begins at 310, with the start of the exploration phase. At 320, average scores are calculated for each available compression process 210 after multiple compressions and transfers are completed. For example, each compression process 210 may be applied on 10, 20, 30, 50, or some other number of data elements 132, and a score 250 is calculated for each data element, e.g., using EQ. 1. The scores 250 for each compression process 210 are then averaged together, e.g., using EQ. 2. At the conclusion of the exploration phase, the compression process 270 that produces the best average score 260 is selected for use.

At 340, the method 300 continues to the exploitation phase. At 350, the selected compression process 270 is used primarily for compressing data elements 132. During this operation, monitoring of computing and network performance may be mostly suspended, so as not to consume host resources unnecessarily.

At 360, while the selected process 270 is primarily being applied, the method 300 sparsely samples the selected process 270, e.g., at a tunable rate, and updates the score for the selected process 270, e.g., using the exponential weighting shown in EQ. 3. Also, the method 300 sparsely samples at least some of the currently non-selected processes, e.g., at a separate tunable rate, computing metrics for those processes and updating the respective scores using, for example, EQ. 3.

At 370, the method 300 selects a new compression process 210 that scores better than the current selected process 270. For example, if another compression process has a lower score (lower is better) than the current selected process, the other compression process is made the new selected process 270. Operation than returns to 350, whereupon the new selected process 270 is primarily used, and to 360, whereupon the new selected process and other non-selected processes are sparsely sampled and their respective scores updated. The method 300 may continue in this manner indefinitely, updating scores and changing selected compression processes 270 as circumstances change.

FIG. 4 shows example method 400 of transferring data from a host to a data storage system and provides an overview of some of the features described above.

At 410, a plurality of compression processes 210 are applied in compressing respective elements 132 of host data.

At 420, a respective set of performance metrics (e.g., 220, 230, and 240) is monitored for each of the plurality of compression processes 210. Each set of performance metrics is indicative of (i) computing performance 220 that results from compressing elements 132 of host data using the respective compression process 210 and (ii) network performance 230 that results from sending compressed elements 132 of host data that are compressed using the respective compression process 210 to the data storage system 180. Each set of performance metrics indicates a respective score 250.

At 430, based on the monitoring, one of the plurality of compression processes 270 is selected at a time for primary use in compressing elements 132 of host data. Each selected process 270 is associated with a best score 260 at the respective time.

An improved technique has been described for transferring data from a host 110 to a data storage system 180. The technique includes monitoring performance metrics (220, 230, 240) indicative of data compression and network transmission from the host 110 to the storage system 180 and dynamically selecting a compression process 270 from among multiple options 210 of compression processes to optimize end-to-end performance based on the monitored indicators. Advantageously, the improved technique selects a process that performs best overall, accounting for both computing and network resources and dynamically adjusting its selection of process as circumstances change.

Having described certain embodiments, numerous alternative embodiments or variations can be made. For example, the selection of compression processes 210 has been shown and described as taking place on the host 110. However, the above-described compression may alternatively take place on the data storage system 180 or on any computer. When activities are localized to a single computer, the technique can be modified to focus only on compute times 220 and sizes 240 but to omit network times 230, which are irrelevant for single-computer implementations. Essentially the same procedures may be used as described above, but without the need to account for network delays.

Further, the above-described embodiments involve a host 110 and a data storage system 180. This is merely an example, however. Alternatively, embodiments may be constructed that involve any two computers connected together over a network.

Also, although embodiments have been described that involve one or more data storage systems, other embodiments may involve computers, including those not normally regarded as data storage systems. Such computers may include servers, such as those used in data centers and enterprises, as well as general purpose computers, personal computers, and numerous devices, such as smart phones, tablet computers, personal data assistants, and the like.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 450 in FIG. 4). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should be interpreted as meaning "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of transferring data from a host to a data storage system, comprising:
applying a plurality of compression processes in compressing respective elements of host data;

monitoring, for each of the plurality of compression processes, a respective set of performance metrics, each set of performance metrics being indicative of (i) computing performance that results from compressing elements of host data using the respective compression process and (ii) network performance that results from sending compressed elements of host data that are compressed using the respective compression process to the data storage system, each set of performance metrics indicating a respective score; and selecting, based on the monitoring, one of the plurality of compression processes at a time for primary use in compressing elements of host data, each selected process associated with a best score at the respective time; and after selecting one of the plurality of compression processes, sparsely applying and monitoring each of a set of currently unselected compression processes and updating the score for each of the set of currently unselected compression processes.

2. The method of claim 1, wherein the method includes an exploration phase in which applying the plurality of compression processes and monitoring each respective set of performance metrics are performed multiple times for each of the plurality of compression processes, such that the score for each of the plurality of compression processes represents an average accumulated over multiple elements of host data.

3. The method of claim 2, wherein selecting one of the plurality of compression processes at a time includes selecting an initial compression process that produces a best average score determined during the exploration phase.

4. The method of claim 2 wherein applying the plurality of compression processes is performed in an unbiased manner during the exploration phase.

5. The method of claim 2, wherein applying the plurality of compression processes is performed in round-robin manner during the exploration phase.

6. The method of claim 2, wherein the method further includes an exploitation phase after the exploration phase, the exploitation phase including applying one of the plurality of compression processes at a time for primary use in compressing elements of host data.

7. The method of claim 6, wherein sparsely applying and monitoring each of a set of currently unselected compression processes and updating the score for each of the set of currently unselected compression processes is performed during the exploitation phase.

8. The method of claim 7, wherein the set of currently unselected compression processes includes a subset of the plurality of compression processes that scored best during the exploration phase.

9. The method of claim 8, wherein a rate of sparsely applying and monitoring currently unselected compression processes is a tunable setting.

10. The method of claim 7 wherein, during the exploitation phase, the method further comprises sparsely monitoring the currently selected compression process and updating the score for the currently selected compression process.

11. The method of claim 10, wherein a rate of sparsely monitoring the currently selected compression process is a tunable setting.

12. The method of claim 10, wherein during the exploitation phase, the method further comprises computing scores in a manner that weights newer performance metrics more heavily than older performance metrics.

13. The method of claim 10, further comprising changing the selected compression process responsive to determining that the score for a currently unselected compression process is better than the score for the currently selected compression process.

14. The method of claim 1, wherein the performance metrics indicative of computing performance include computing time consumed by compressing elements of host data.

15. The method of claim 1, wherein the performance metrics indicative of network performance include round-trip time between sending compressed elements of host data to the data storage system and receiving acknowledgements of receipt from the data storage system.

16. A computerized apparatus, comprising control circuitry that includes a set of processors coupled to memory, the control circuitry constructed and arranged to:

apply a plurality of compression processes in compressing respective elements of host data;

monitor, for each of the plurality of compression processes, a respective set of performance metrics, each set of performance metrics being indicative of (i) computing performance that results from compressing elements of host data using the respective compression process and (ii) network performance that results from sending compressed elements of host data that are compressed using the respective compression process to the data storage system, each set of performance metrics indicating a respective score;

select, based on the monitoring, one of the plurality of compression processes at a time for primary use in compressing elements of host data, each selected process associated with a best score at the respective time; and after selection of one of the plurality of compression processes, sparsely apply and monitor each of a set of currently unselected compression processes and update the score for each of the set of currently unselected compression processes.

17. A computer program product including a set of non-transitory, computer-readable media having instructions which, when executed by control circuitry of a computerized apparatus, cause the computerized apparatus to perform a method of transferring data from a host to a data storage system, the method comprising:

applying a plurality of compression processes in compressing respective elements of host data;

monitoring, for each of the plurality of compression processes, a respective set of performance metrics, each set of performance metrics being indicative of (i) computing performance that results from compressing elements of host data using the respective compression process and (ii) network performance that results from sending compressed elements of host data that are compressed using the respective compression process to the data storage system, each set of performance metrics indicating a respective score; and selecting, based on the monitoring, one of the plurality of compression processes at a time for primary use in compressing elements of host data, each selected process associated with a best score at the respective time; and after selecting one of the plurality of compression processes, sparsely applying and monitoring each of a set of currently unselected compression processes and updating the score for each of the set of currently unselected compression processes.

18. The computer program product of claim 17, wherein the method includes an exploration phase in which applying the plurality of compression processes and monitoring each respective set of performance metrics are performed multiple times for each of the plurality of compression processes, such that the score for each of the plurality of compression processes represents an average accumulated over multiple elements of host data.

19. The computer program product of claim 18, wherein the method further includes an exploitation phase after the exploration phase, the exploitation phase including applying one of the plurality of compression processes at a time for primary use in compressing elements of host data.

20. The computer program product of claim 19, wherein sparsely applying and monitoring each of a set of currently unselected compression processes and updating the score for each of the set of currently unselected compression processes is performed during the exploitation phase.

* * * * *